May 11, 1926.
J. H. WAGENHORST
1,584,576
VEHICLE WHEEL
Filed Feb. 24, 1919    2 Sheets-Sheet 1
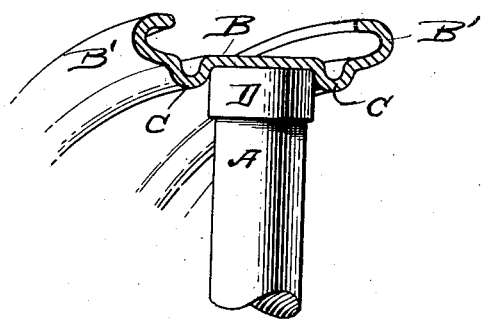
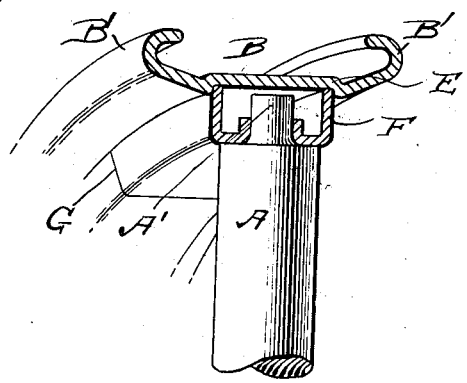
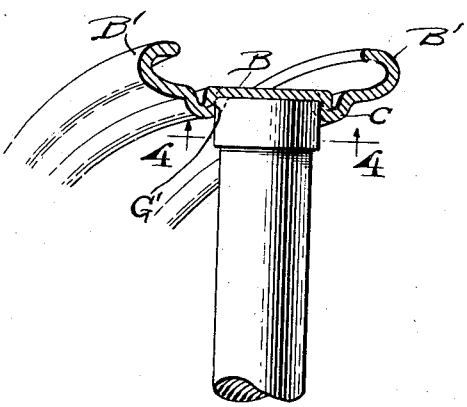
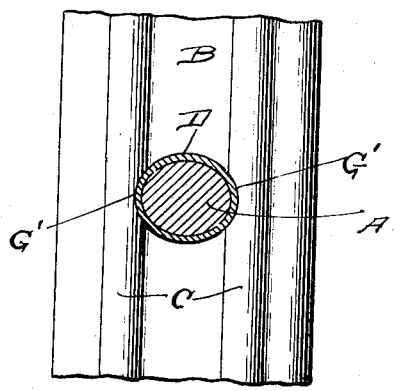
Inventor
J. H. Wagenhorst May 11, 1926.

J. H. WAGENHORST

VEHICLE WHEEL

Filed Feb. 24, 1919  2 Sheets-Sheet 2

1,584,576

Inventor
J. H. Wagenhorst.

By Hull Smith Brock & West
Attys.

Patented May 11, 1926.

1,584,576

UNITED STATES PATENT OFFICE.

JAMES H. WAGENHORST, OF AKRON, OHIO.

VEHICLE WHEEL.

Application filed February 24, 1919. Serial No. 278,640.

This invention relates generally to wheels, and more particularly to a wheel comprising a plurality of wooden spokes and a sheet metal felly or fixed rim; the object being to provide an exceedingly strong and durable wheel and one which can be quickly, easily and economically manufactured.

With these objects in view the invention consists in combining with the plurality of wooden spokes, a sheet metal felly or fixed rim so constructed upon its interior as to maintain a fixed position upon the spoke ends and be held against lateral movement; and this fixed rim or felly embodying these characteristic features of cooperation, is contracted upon the plurality of spokes, thereby completing the assembly and providing a finished wheel body.

The invention consists also in certain details of construction hereinafter fully described and pointed out in the claims.

Figure 6:
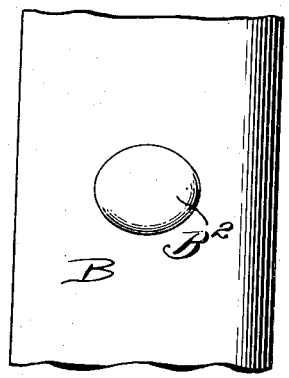
Figure 5:
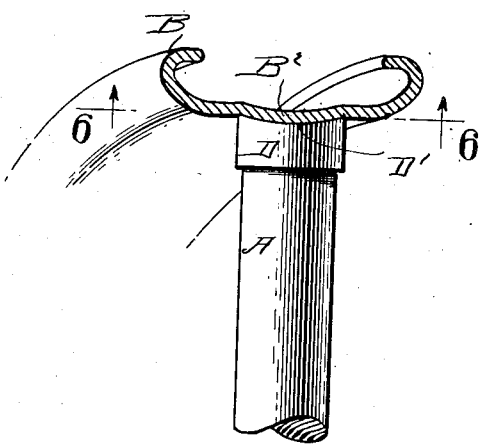
Figure 8:
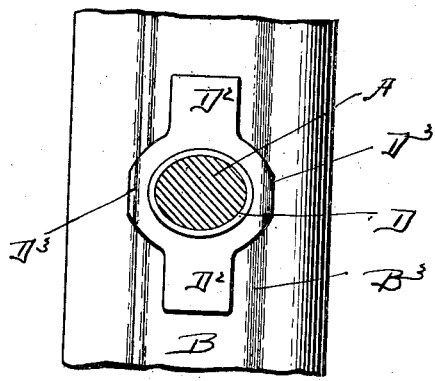
Figure 7:
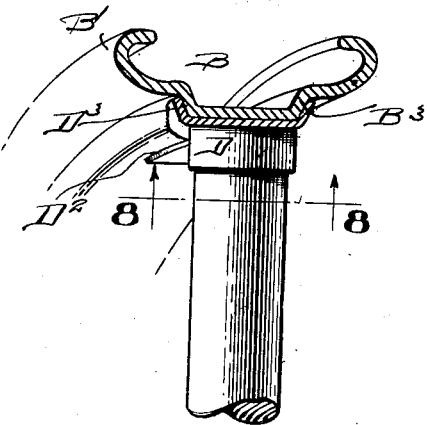

In the drawings forming a part of this specification Fig. 1 is a sectional view partly in elevation showing a portion of a wheel felly or fixed rim combined with a wooden spoke; Fig. 2 is a similar view in which the rim and spoke are shown in combination with an intermediate fixed rim or felly; Fig. 3 is detailed view illustrating a slight modification; Fig. 4 is a section on the line 4—4 of Fig. 3; Figs. 5 and 7 show still further modifications and Figs. 6 and 8 are sections taken on the line 6—6 and 8—8 of Figs. 5 and 7 respectively.

There are various methods of carrying into effect the fundamental principles of my invention but in all of them wooden spokes A are employed and likewise a rim B having tire receiving flanges.

In Fig. 1 the rim B, which, in this case serves as both the felly and the tire carrying rim, is provided with tire engaging flanges B', and the base of the rim is formed with inwardly rolled beads or ribs C, these ribs being spaced apart a sufficient distance to receive therebetween the metal cap D placed upon the end of the spoke A, and if desired the cap and the base of the rim can be united by spot welding or otherwise.

The beads stiffen the rim materially and also support the caps and spokes laterally, and when the rim is contracted about the spokes, either by heat treatment or by the upsetting of the rim, a wheel structure will be provided which will be strong and durable and of the minimum weight consistent with ability to carry loads imposed thereon and also to withstand lateral strains.

In Fig. 2 the rim B is formed with tire carrying flanges B' and the base thereof is so constructed as to produce a central channeled portion bounded by inwardly projecting shoulders or beads E, these shoulders or beads being spaced apart a sufficient distance to receive therebetween the side flanges F of a sheet metal felly, the base of which is apertured to receive the tenon A' of the spoke A.

This felly F may be split at one point as indicated at G and the spokes are assembled therein and the tire carrying rim applied thereto and contracted thereon either by heat or upsetting and in this manner the proper contracting pressure will be applied to complete the assemblage of the spokes, sheet metal felly and tire carrying rim, the inwardly projecting beads or shoulders engaging the flanges of the felly maintaining these parts against relative lateral or transverse movement.

In the construction shown in Figs. 3 and 4 the tire carrying rim is formed with parallel in-rolled beads C exactly the same as illustrated in Fig. 1, but at definite intervals the opposed edges of these beads are depressed or indented as indicated at G', in order to receive therein the cap D, applied to the end of the spoke A and the rim is contracted about the spokes either by heating or upsetting and after the assemblage has been completed and the rim shrunk thereon it will be seen that by virtue of the depressions or indentations in the opposed edges of the inwardly projecting circumferential beads that the spokes will be held against both circumferential and lateral movement and consequently it will not be necessary to spot weld the rim and cap, although as a matter of precaution this welding can be employed if desired, but as before stated, it is not necessary in view of the fact that the spoke ends will be held against both lateral and circumferential movement, or in other words the tire carrying rim will be held securely fixed upon the spoke ends after the assemblage has been once completed by the proper contraction of the tire carrying rim.

In Figs. 5 and 6 the outer end of the cap D is depressed centrally as shown at D' and the central portion of the base of the tire carrying rim is correspondingly depressed as shown at B², this interengagement of the depressions serving to position the rim and spokes and hold them against both circumferential and lateral movement, and as a matter of precaution the rim and cap may be welded at the points of depression in order to prevent any possible dislocation of the parts.

In Figs. 7 and 8 I have shown the cap D as provided with oppositely disposed circumferential ears D², and oppositely disposed laterally projecting ears D³. The rim base is formed with a central inwardly projecting portion B³ and after the rim has been placed upon the capped spokes the laterally projecting ears D³ are bent over outwardly to engage the shouldered portions of the central depressions B³ thereby holding the parts against lateral movement, and the oppositely disposed circumferentially extending ears D² are spot welded to the central inwardly projecting portion of the base thereby providing a connection between the rim and cap and preventing any possible circumferential movement.

In all of the structures herein shown and described the tire carrying rim is contracted about the assemblage of spokes either by heating the rim and permitting it to contract and provide the necessary radial compression, or the rim can be upset so as to provide the necessary contraction. It will also be noted that the connection between the spokes and rim is such that both circumferential and lateral movement is prevented and by constructing a wheel body in the manner herein shown and described, an exceedingly strong and durable wheel is provided, one which is exceedingly light, and one which can be quickly, easily and economically manufactured.

The construction illustrated in Figure 2 of this application is also shown, described, and claimed in my co-pending application Serial No. 72,920, for vehicle wheels, filed December 3, 1925, which is a continuation of the present application. The construction illustrated in Figures 7 and 8 of this application is also shown, described, and claimed in my co-pending application Serial No. 72,919, for vehicle wheels, filed December 3, 1925, as a continuation of the present application.

Having thus described my invention, what I claim is:—

1. In a vehicle wheel the combination with a rim having outwardly extending tire engaging flanges, the base of said rim having parallel circumferential inwardly projecting portions, of a plurality of spokes, the outer ends of which are positioned between the parallel inwardly projecting portions of the rim and thereby held against lateral movement when said rim is contracted upon said spokes.

2. In a vehicle wheel, the combination with a rim having outwardly extending tire engaging flanges, the base of said rim having parallel circumferential inwardly projecting beads or ribs, of a plurality of spokes having their outer ends positioned between said beads or ribs.

3. In a wheel, the combination with a fixed rim having tire engaging flanges and provided with parallel circumferential inwardly projecting beads or ribs, of a plurality of spokes provided with caps at their outer ends, said caps contacting with the fixed rim between the beads or ribs thereof when said fixed rim is contracted upon the spokes.

4. In a wheel, the combination with a fixed rim having tire engaging flanges and provided with parallel circumferential inwardly projecting beads or ribs, of a plurality of wooden spokes, metal caps upon the ends of said spokes, said caps contacting with the fixed rim between the beads or ribs, said fixed rim being contracted upon said spokes and caps to bind them together.

5. In a vehicle wheel, the combination with a rim having outwardly extending tire engaging flanges, the base of said rim having parallel circumferential inrolled beads, of a plurality of spokes, the outer ends thereof being positioned between said inwardly projecting parallel inrolled beads.

6. In an automobile wheel, the combination with a plurality of spokes, of metal caps on the outer ends of said spokes, a fixed rim contracted upon said spokes and caps, said rim having tire retaining flanges and integral inwardly projecting portions, said integral inwardly projecting portions being adapted to engage the caps and hold said caps and spokes against movement.

7. A vehicle wheel comprising a plurality of wooden spokes having metallic caps upon their ends and a flanged metal rim contracted about said spokes, said rim having circumferential inwardly projecting portions, said inwardly projecting portions having depressions for engagement with the spoke caps.

8. A vehicle wheel comprising a plurality of wooden spokes having caps upon their ends and a flanged sheet metal rim having spaced circumferential inrolled beads, the caps contacting with the rim between the beads and secured against both lateral and circumferential movement.

In testimony whereof, I hereunto affix my signature.

JAMES H. WAGENHORST.